Sept. 13, 1932.  E. J. HADLEY  1,876,668
TALKING PICTURE PROJECTOR
Filed June 11, 1930    3 Sheets-Sheet 2

Inventor:
Edwin J. Hadley,
By his Attorney
George D. Richards

Sept. 13, 1932.       E. J. HADLEY           1,876,668
               TALKING PICTURE PROJECTOR
               Filed June 11, 1930    3 Sheets-Sheet 3
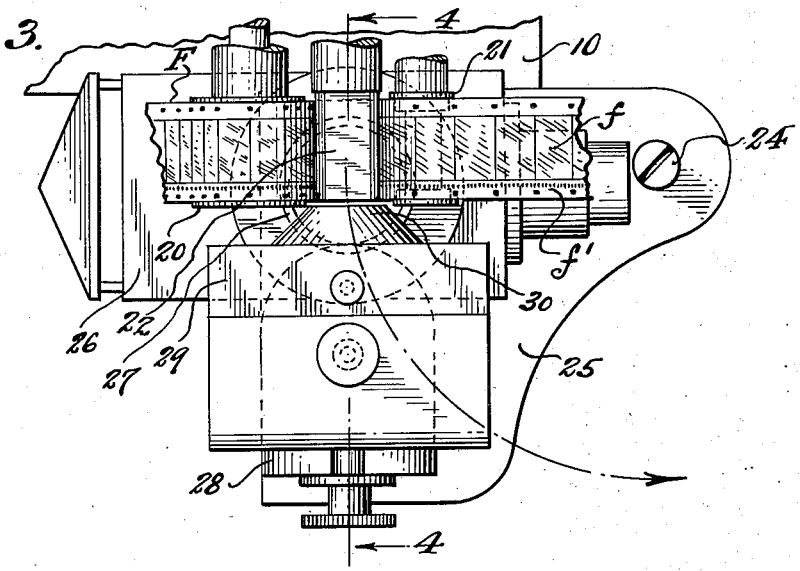
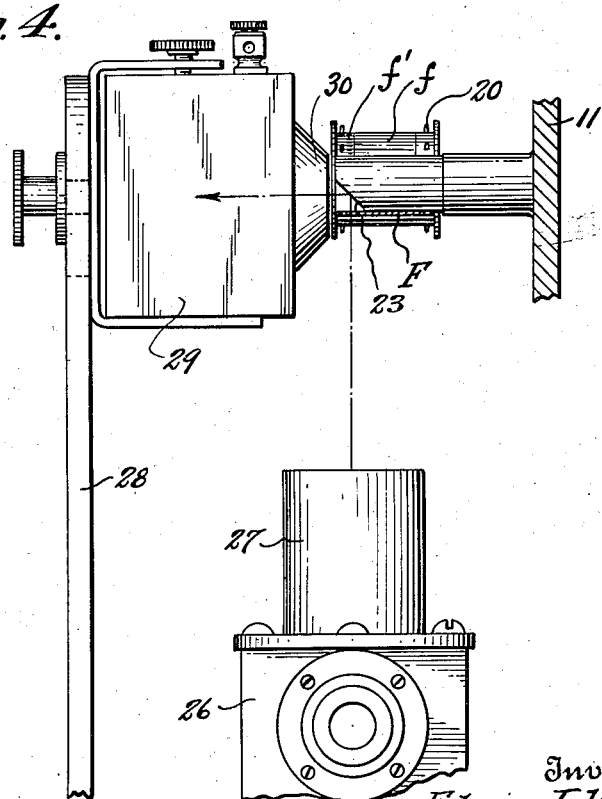
Inventor:
Edwin J. Hadley,
By his Attorney
George D. Richards Patented Sept. 13, 1932

1,876,668

UNITED STATES PATENT OFFICE

EDWIN J. HADLEY, OF BROOKLYN, NEW YORK

TALKING PICTURE PROJECTOR

Application filed June 11, 1930. Serial No. 460,343.

This invention has reference to improvements in talking picture apparatus.

This invention has for its principal object to provide a novel construction of talking picture projecting mechanism in which is provided a novel arrangement and construction of sound record translating means, so related to the picture record projecting mechanism as to be movable into and out of operative position at the side of the latter where operator threads the film. By such novel arrangement, a much more convenient and unobstructed access to the film running devices of the mechanism may be had for threading the film preparatory to exhibiting projection thereof, while at the same time a closer synchronization of sound and picture presentation is attainable.

Another object of this invention is to provide, in conjunction with a novel location and construction of sound record reflector means, a novel movable mounting or carrying structure for supporting the exciter light source or lamp and the light sensitive cell making up the sound record translating means, whereby the exciter light source is arranged to project its light beam to the light sensitive cell in a direction substantially at right angles to the longitudinal axis of the picture record projecting path.

Other objects of this invention, not at this time more particularly enumerated, will be clearly understood from the following detailed description of the same.

An illustrative embodiment of this invention is shown in the accompanying drawings, in which:—

Figure 1:
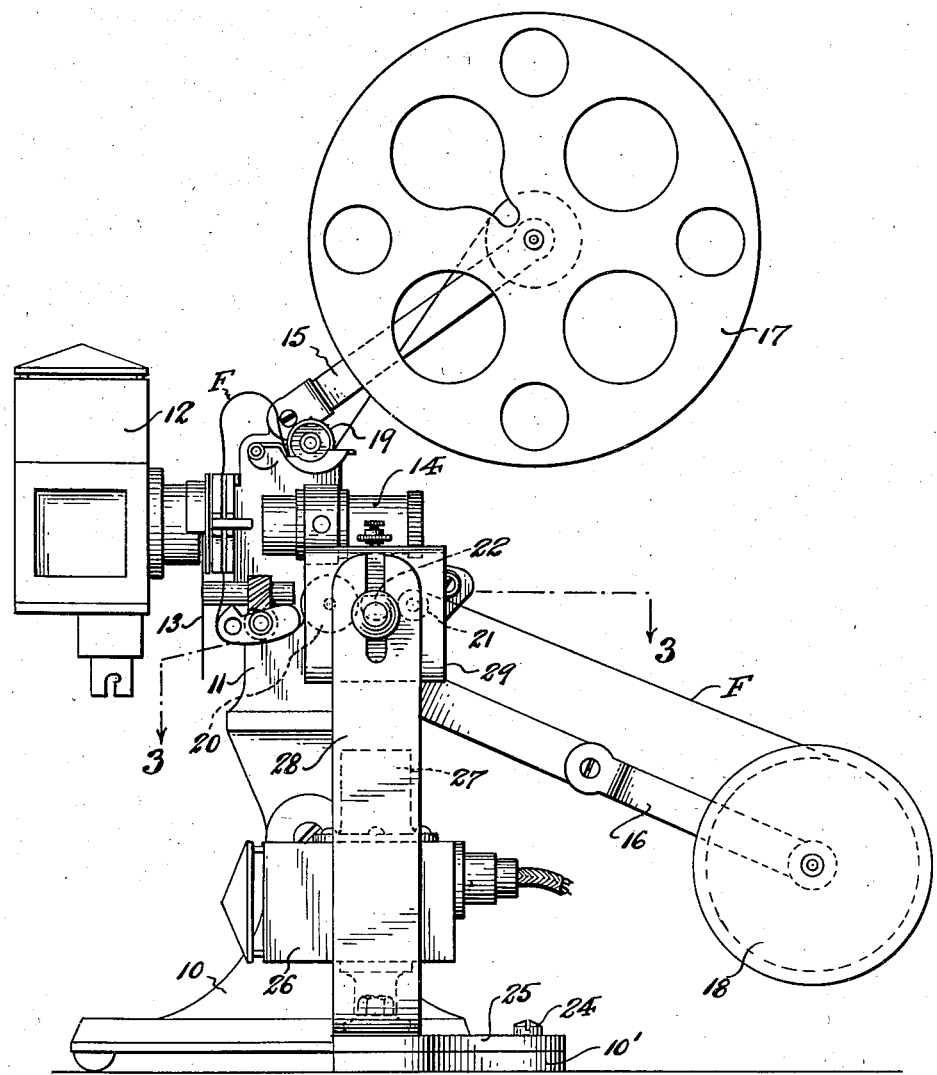
Figure 2:
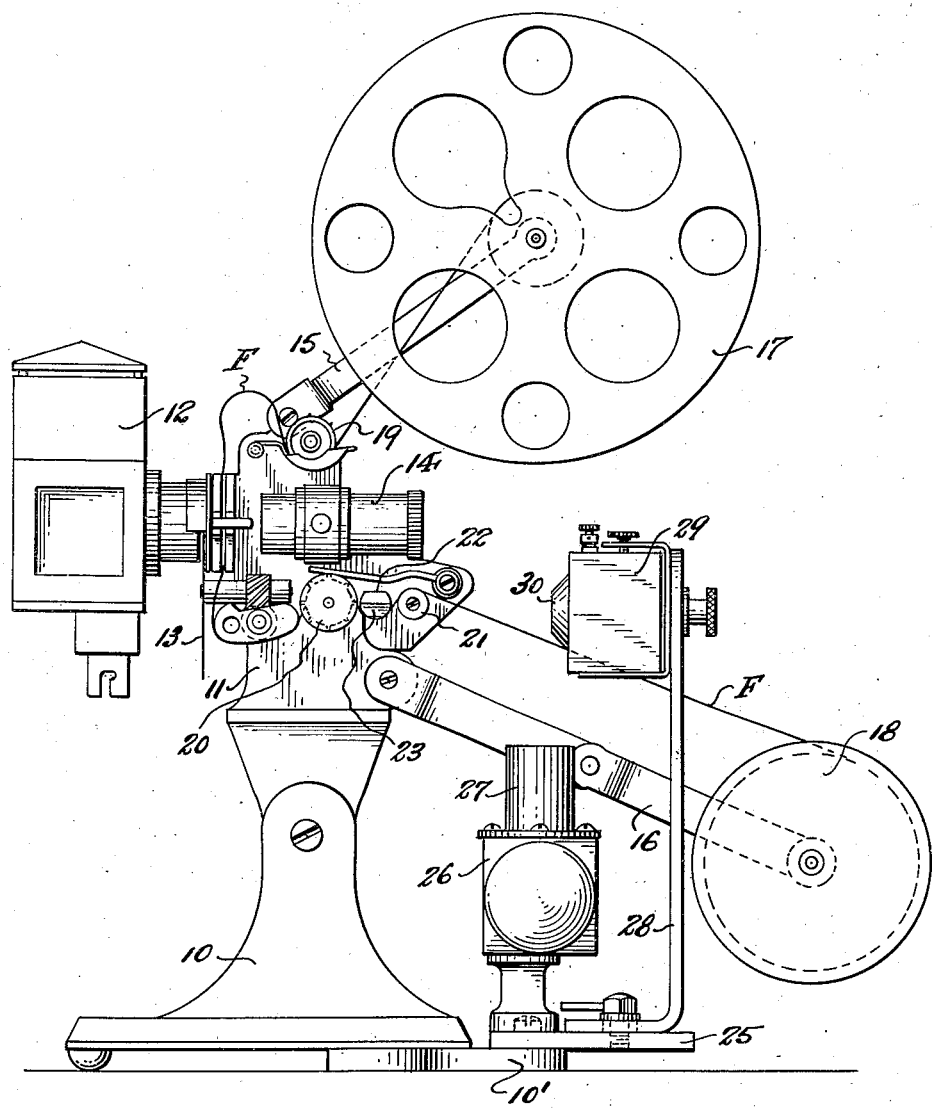

Fig. 1 is a side elevation of the talking picture projector viewed toward its right hand side as it faces the picture exhibiting screen, said view showing the sound record translating means occupying its operative position; Fig. 2 is a view similar to that of Fig. 1, but showing the sound record translating means moved to inoperative or open position giving ready access to the film running mechanism of the projector; Fig. 3 is a fragmentary horizontal section, taken on line 3—3 in Fig. 1; and Fig. 4 is a vertical transverse section, taken on line 4—4 in Fig. 3.

Similar characters of reference are employed in the above described views, to indicate corresponding parts.

Referring to said drawings, the reference character 10 indicates the pedestal of the projector, at the upper end of which is adjustably connected and supported the carrier bracket 11, upon which is mounted any usual form of film running mechanism, picture record illuminating unit 12 with its cooperating shutter device 13, and projection lens housing 14. Also suitably connected with said carrier bracket 11, are supporting arms 15 and 16 which respectively carry the film supply reel 17 and the film take-up reel 18.

The film running mechanism includes the usual feed sprocket 19, by means of which the film is pulled off the supply reel 17, and also includes the main film running sprocket 20, which, in cooperation with the usual guiding devices, draws the film across the path of the illuminating light projection beam emanating from the illuminating unit 12 and its shutter mechanism 13, whereby the light traverses the picture record furnished by the film, and thence passes through the projection lens housing 14 to a projection screen (not shown), substantially in a manner at present well known in the art. The sprockets 19 and 20 and reels 17 and 18 are all mechanically rotated by suitable power transmission mechanism (not shown) in any desired or customary manner.

In the arrangement, as thus far described, the main film running sprocket 20 and associated guiding devices are exposed at one side of the machine so as to be readily accessible for the operations of threading a film in operative relation thereto.

Mounted on the carrier bracket 11, preferably at a point intermediate the main film running sprocket 20 and an outlying guide roller 21 and preferably off-set relative to the plane of the axis of said running sprocket 20, is a reflector device 22 having at the lower or underside of its extremity an undercut angular reflecting surface 23, the angle of which usually approximates 45 degrees. The dimensions and position of said reflector device is such that when the film F passes beneath the same, the picture record sections *f* will run back of the location of the reflector surface 23, while the sound record section *f'* will run beneath and in alinement with said reflector surface 23. Said reflector surface may be a flat plane surface, but preferably consists in a concave reflector surface having tendency to concentrate the light beam reflected therefrom toward a light sensitive cell of the sound record translating means.

The pedestal 10 is provided at its forward side with a base extension 10'. Pivotally mounted on said base extension 10', by means of pivot screw or stud 24, is a movable leaf or bracket plate 25 adapted to turn about said pivot screw or stud in horizontal plane. Fixed on said bracket plate 25 is a housing 26 in which is disposed an exciter lamp (not shown) and projecting upwardly from said housing 26 and in communication therewith is a lens tube 27 for directing and concentrating the light emanating from the exciter lamp within said housing 26. Suitably fixed on said bracket plate 25 is an upstanding bracket arm 28, to the upper end of which is fixed a housing 29 having an apertured light intake portion 30, in which housing is contained a light sensitive cell (not shown) operating to translate the light, as modified by the sound record section *f'* of the film F, into electrical energy of corresponding frequency effective for operation of sound reproduction in the manner well known to the art.

The movable leaf or bracket plate 25 may be swung on its pivotal connection so as to carry the exciter lamp housing and light sensitive cell housing into operatively aligned relation to the reflecting surface 23 of the reflector member 22, in which position said parts are disposed so that the exciter lamp housing 26 and lens tube 27 are vertically aligned beneath said reflecting surface 23, and the apertured portion 30 of the light sensitive cell housing 29 is laterally aligned with and opposed to said reflecting surface, the parts being thus movable into such operative positions toward the open side of the film running devices after the film has been threaded upon the film running mechanism ready for operation.

With the parts in the operative positions described, when the film is running, light from picture record illuminating unit 12 passes through the picture record sections *f* of the film F and thence through the projecting lens to the display screen, while light from the exciter lamp in the housing 26 is directed through the lens tube 27 upon and through the sound record sections *f'* of the film F to the reflecting surface 23 of the reflector device 22, being thence deflected through the apertured portion 30 of the housing 29 upon the light sensitive cell contained within the latter.

The novel means for removably supporting the sound record translating means in the described novel operative locational relation to the film running mechanism, results in very practical advantages, viz., (*a*) It permits the sound record translating means to be angularly off-set from the path of picture projection, with consequent diminished tendency of light interference by the picture record illumination with the exciting light applied to said sound record translating means.

(*b*) It permits the reflector device to be located very close to the main film running sprocket, whereby an exact synchronization of picture record reproduction and corresponding sound record reproduction is attained; and permits the reflector to lie between relatively horizontally aligned film running sprocket and associated guide roller, thereby presenting substantially horizontal portions of the film at proper tension, in operative relation to the reflector and sound record translating means.

(*c*) It permits temporary removal at will of sound record translation devices from proximity to the film and film running mechanism, whereby ready and unobstructed access to the latter mechanism may be attained at any desired time, but especially when threading the film in operative relation thereto preparatory to picture projection. The movable mounting or carrying means is so arranged that although the exciter lamp and associated lens tube together with the light sensitive cell may be easily swung into or out of service relation to the projector, such movements do not require any disassembly of said parts or the circuit connections thereof.

From the above description it will be obvious that a very convenient, compact and efficient design of talking picture projector is provided by this invention. Although one embodiment illustrating a preferred form thereof has been shown in the accompanying drawings and above described, it will be understood that many variations in arrangement and detail structure may be made within the spirit of this invention as defined in the appended claims.

Having thus described the invention, I claim:—

1. In a talking picture projector, a supporting structure having a film running mechanism including a main driving sprocket mounted thereon, a reflector means to be traversed by the running film, said reflector means being fixed to said supporting structure adjacent to but off-set from the plane of the axis of said main driving sprocket, said reflector means having an undercut angular reflecting surface with which the sound record sections of the running film register, and means movably connected with said supporting structure for mounting sound record translating means subject to selective disposition in active or inactive relation to said reflector and running film.

2. In a talking picture projector, a supporting structure carrying a film running mechanism, a reflector means beneath which the sound record sections of substantially horizontally moving portions of the running film register, sound record translating means including an exciter light source arranged to direct a light beam upwardly through the film sound record sections to the reflector and a light sensitive cell outwardly off-set from said reflector to receive exciting light reflected therefrom, and means movably connected with said supporting structure for mounting said sound record translating means subject to selective disposition in active or inactive relation to said reflector and running film.

3. In a talking picture projector, a supporting structure carrying a film running mechanism, a reflector means beneath which the sound record sections of substantially horizontally moving portions of the running film register, sound record translating means including an exciter light source arranged to direct a light beam upwardly through the film sound record sections to the reflector and a light sensitive cell outwardly off-set from said reflector to receive exciting light reflected therefrom, and movable carrying means for said sound record translating means connected with said supporting structure and being manipulatable to dispose said translating means in operative or inoperative relation to said reflector and running film.

4. In a talking picture projector, a supporting structure carrying a film running mechanism including a main driving sprocket, a reflector means to be traversed by the running film, said reflector means being mounted, in direction of film movement, beyond said driving sprocket, said reflector means having an undercut angular reflecting surface beneath which the sound record sections of the running film register, sound record translating means including an exciter light source arranged to direct a light beam upwardly through the film sound record sections to said reflecting surface and a light sensitive cell outwardly off-set from said reflecting surface to receive exciting light directed thereby, and movable carrying means for said sound record translating means pivotally connected with said supporting structure and being manipulatable to dispose said translating means in operative or inoperative relation to said reflector and running film.

5. In a talking picture projector having an open film running mechanism at one side thereof, a reflector means beneath which sound record sections of substantially horizontal portions of the running film register, a carrying plate pivotally connected to said projector to swing in horizontal plane, an exciter lamp source fixed on said carrying plate and movable thereby beneath said reflector to direct a beam of exciting light upwardly through said sound record sections of the running film to said reflector, a bracket arm supported by said carrying plate, and a light sensitive cell carried by said bracket arm, inward swinging movement of said carrying plate operating to dispose both said exciter light source and said cell in operative relations to said reflector, and outward movement of said carrying plate serving to remove said exciter light source and cell from said normal operative positions to expose and give unobstructed access to the open film running mechanism.

In testimony, that I claim the invention set forth above I have hereunto set my hand this 2nd day of June 1930.

EDWIN J. HADLEY.